United States Patent
McCarthy et al.

(10) Patent No.: US 10,661,606 B2
(45) Date of Patent: May 26, 2020

(54) VEHICLE RECOVERY LADDER

(71) Applicant: MAXTRAX AUSTRALIA PTY LTD, Brisbane (AU)

(72) Inventors: Bradley John McCarthy, Brisbane (AU); Neil Davidson, Brisbane (AU)

(73) Assignee: MAXTRAX AUSTRALIA PTY LTD, Brisbane (AU)

( * ) Notice: Subject to any disclaimer, the term of this patent is extended or adjusted under 35 U.S.C. 154(b) by 61 days.

(21) Appl. No.: 15/727,381

(22) Filed: Oct. 6, 2017

(65) Prior Publication Data

US 2018/0029416 A1    Feb. 1, 2018

Related U.S. Application Data

(63) Continuation-in-part of application No. PCT/AU2016/051051, filed on Nov. 4, 2016.

(30) Foreign Application Priority Data

Nov. 6, 2015    (AU) ................................. 2015904551
May 8, 2017    (AU) ................................. 2017901686

(51) Int. Cl.
    *B60B 39/12*    (2006.01)
(52) U.S. Cl.
    CPC ........ *B60B 39/12* (2013.01); *B60B 2900/721* (2013.01)
(58) Field of Classification Search
    CPC .......... B60B 39/12; B60C 11/16; B60C 27/00
    USPC .......................................................... 238/14
    See application file for complete search history.

(56) References Cited

U.S. PATENT DOCUMENTS

| | | | | |
|---|---|---|---|---|
| 1,339,612 A | * | 5/1920 | Wilkins | B60B 39/12 238/14 |
| 1,594,623 A | * | 8/1926 | Lundberg | B60B 39/12 238/14 |
| 1,863,316 A | * | 6/1932 | Webster, Jr. | B60B 39/12 238/14 |
| 2,572,996 A | * | 10/1951 | Dunlap | B60C 11/16 152/210 |
| 3,125,147 A | * | 3/1964 | Hakka | B60C 11/16 152/210 |

(Continued)

FOREIGN PATENT DOCUMENTS

| | | |
|---|---|---|
| AU | 2010100831 | 9/2010 |
| AU | 2013206349 | 1/2014 |

(Continued)

OTHER PUBLICATIONS

"Maxtrax Dentistry—tooth replacement"; www.pradopoint.com/showthread.php?35771-Maxtrax-Dentistry-tooth-replacement; Jun. 15, 2015.

(Continued)

*Primary Examiner* — Mark T Le
(74) *Attorney, Agent, or Firm* — Klein, O'Neill & Singh, LLP (57) ABSTRACT

A vehicle recovery ladder includes a body and traction members fastened to the body. Advantageously, in one embodiment any damaged traction members may be readily released and replaced to maintain the performance of the ladder. The traction members may be fastened to the body during forming of the body, Advantageously, the traction members are releaseably fastened to the body.

18 Claims, 5 Drawing Sheets

(56) References Cited

U.S. PATENT DOCUMENTS

| | | | | |
|---|---|---|---|---|
| 3,152,761 | A | * | 10/1964 | Vaughan, Jr. ........... B60C 27/08 238/14 |
| 3,640,459 | A | * | 2/1972 | Preisler .................. B60B 39/12 180/90.6 |
| 3,836,075 | A | | 9/1974 | Botbol |
| 3,861,592 | A | * | 1/1975 | Fisher ..................... B60B 39/12 152/210 |
| 4,164,971 | A | * | 8/1979 | Strand ..................... F16B 33/06 156/330 |
| 4,210,280 | A | | 7/1980 | Reisner |
| 5,538,183 | A | | 7/1996 | McGee |
| D392,924 | S | * | 3/1998 | Shleymovich ............... D12/608 |
| 5,833,136 | A | * | 11/1998 | Japp ........................ B60B 39/12 238/14 |
| 8,231,066 | B2 | | 7/2012 | McCarthy |
| 2008/0217077 | A1 | * | 9/2008 | McCarthy .............. B60B 39/12 180/9 |

FOREIGN PATENT DOCUMENTS

| | | |
|---|---|---|
| EP | 1943110 | 9/2013 |
| WO | WO2017-070740 | 5/2017 |

OTHER PUBLICATIONS

International Search Report on corresponding PCT application (PCT/AU2016/051051) from International Searching Authority (Australian Patent Office) dated Jan. 25, 2017.

Written Opinion on corresponding PCT application (PCT/AU2016/051051) from International Searching Authority (Australian Patent Office) dated Jan. 25, 2017.

Written Opinion on corresponding PCT application (PCT/AU2016/051051) from International Searching Authority (Australian Patent Office) dated Jun. 6, 2017.

* cited by examiner

VEHICLE RECOVERY LADDER

CROSS-REFERENCE TO RELATED APPLICATION

This application is a Continuation-in-Part of International Application No. PCT/AU2016/051051, filed Nov. 4, 2016, which claims priority from Australian Application No. 2015904551, filed Nov. 6, 2015. This application also claims priority from Australian provisional Application No. 2017901686, filed May 8, 2017. The disclosures of both prior applications are incorporated by reference herein in their entireties.

TECHNICAL FIELD

The present disclosure relates to a vehicle recovery ladder. The subject matter of the disclosure has particular, although not exclusive, application to four-wheel drive (4WD) vehicles.

BACKGROUND

The reference to any prior art in this specification is not, and should not be taken as an acknowledgement or any form of suggestion that the prior art forms part of the common general knowledge.

Four-wheel drive (4WD) vehicles invariably become stuck in sand and mud. Traditionally, shovels were used to dig and extricate stuck 4WD vehicles. Alternatively, timber could be jammed beneath tires in an attempt to gain more wheel traction.

A known vehicle recovery ladder disclosed in AU 2010100831 provides improved traction when extricating vehicles. Advantageously, the ladder is light-weight being molded from polymeric material and includes traction members to assist the wheel in climbing out of the mire. However, the Applicant has perceived that the traction members can wear or melt in extreme circumstances, such as the spinning of a wheel, which can severely hamper the ongoing performance of the ladder.

Embodiments of the present disclosure provide an improved vehicle recovery ladder.

SUMMARY

According to one aspect of the present disclosure, there is provided a vehicle recovery ladder including:
a body;
traction members for fastening to the body during forming of the body.

Advantageously, any damaged traction members may be readily released and replaced to maintain the performance of the ladder.

The traction members may be bonded to the body with a chemical and/or mechanical bond. The traction members may be for releasably fastening to the body during forming of the body.

The traction members may be configured to not damage the tire during use. Preferably, the traction members are less durable than a tire so as to sustain damage before the comparatively more expensive tire. The traction members may include polymeric material (e.g. elastomer, polyurethane, thermoplastic, nylon). The body may also include polymeric material (e.g. elastomer, polyurethane, thermoplastic, nylon). The traction members may include metal material (e.g. metal alloy), ceramic material or rubber material. In one embodiment, the body and the traction members are each integrally formed (e.g. injection molded) from the same material.

Each traction member may include a rotational release means for rotationally releasing the traction member from the body. The rotational release means may include a thread. The rotational release means may include a tool recess for receiving a release tool. The recess may be hexagonal, pentagonal, octagonal, square, slotted, cross or star shaped.

The ladder may include locks for locking the traction members to the body. Each traction member may include an inhibiter for inhibiting unintentional release of the traction member from the body. The inhibiter may include one or more formations (e.g. tongue, groove, etc.). The inhibiter may include a tongue or groove.

The traction members may be released from the rear of the ladder. Alternatively, the traction members may be released from the top of the ladder. Each traction member may include a skirt from which a tooth extends. Each traction member may be over-molded. Each traction member may include a thread located either above or below the skirt.

According to another aspect of the present disclosure, there is provided a traction member for fastening to a body of a vehicle recovery ladder during forming of the body, the traction member including:
release means for releasing the traction member from the body.

The release means may include rotation release means for releasing the traction member According to another aspect of the present disclosure, there is provided a method for repairing a damaged traction member of a vehicle recovery ladder, the method involving:
releasing, from the ladder, the traction member fastened to a body of the ladder during forming of the body.

The step of releasing may involve rotating the traction member.

According to another aspect of the present disclosure, there is provided a vehicle recovery ladder including:
a body;
traction members bonded to the body during forming of the body.

The bonding may form a chemical and/or mechanical bond. The chemical bond may be formed by crosslinking of body and traction member materials. The chemical bond may be broken to release the traction members from the body. The mechanical bond may include engaged threads.

According to another aspect of the present disclosure, there is provided a method of forming a vehicle recovery ladder, the method including the steps of:
locating traction members in a mold; and
molding a body to form a bond with the traction members.

The method may involve molding the traction members in another mold. The traction members located in the mold may be set prior to molding the body. The traction members may have a lower melting point than the body to facilitate chemical bonding between the traction members and the body.

According to another aspect of the present disclosure, there is provided a vehicle recovery ladder including:
a body;
tire traction members for releasably fastening to the body, the tire traction members including threads for engaging within the body.

The threads may become engaged within the body when injection molding the body in a mold containing the tire traction members. The traction members may include metal material. Each traction member may include an inhibiter for inhibiting unintentional release of the traction member from the body.

According to another aspect of the present disclosure, there is provided a tyre traction member for a vehicle recovery ladder, the tire traction member including:
 a thread for engaging within a body of the ladder; and
 release means for releasing the traction member from the body.

According to another aspect of the present invention, there is provided a method for repairing a damaged tire traction member of a vehicle recovery ladder, the tire traction member including a thread engaged within a body of the ladder, the method involving:
 releasing the tire traction member from the body.

According to another aspect of the present disclosure, there is provided a vehicle recovery ladder including:
 a body;
 tire traction members bonded to the body, the tire traction members including threads engaged within the body.

According to another aspect of the present disclosure, there is provided a method of forming a vehicle recovery ladder, the method including the steps of:
 locating tire traction members in a mold; and
 molding a body to form a bond with threads of the tire traction members.

Any of the features described herein can be combined in any combination with any one or more of the other features described herein within the scope of the disclosure.

BRIEF DESCRIPTION OF THE DRAWINGS

Preferred features, embodiments and variations of the disclosure may be discerned from the following Detailed Description which provides sufficient information for those skilled in the art to practice the subject matter thereof. The Detailed Description is not to be regarded as limiting the scope of the preceding Summary in any way. The Detailed Description will make reference to a number of drawings as follows:

FIG. 1b is a side sectional view of the vehicle ladder of FIG. 1a;

FIG. 1c is a side view of the vehicle ladder of FIG. 1a;

DETAILED DESCRIPTION

Figure 1A:
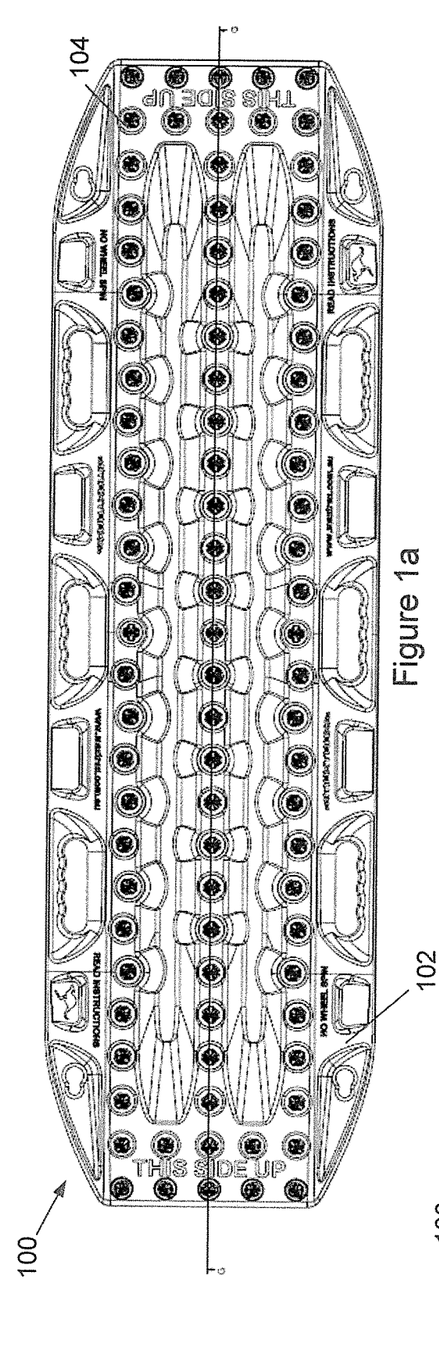
FIG. 1a is a plan view of a vehicle ladder in accordance with an embodiment of the present disclosure.
Figure 1B:
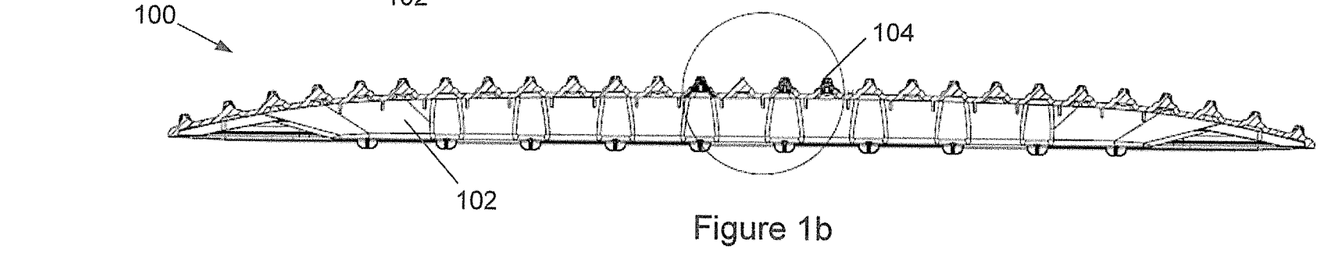
Figure 1C:
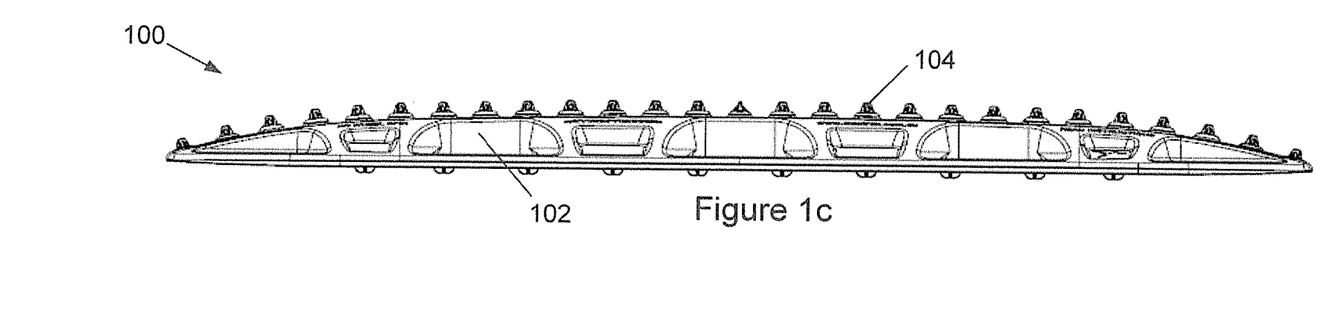

According to embodiments of the present disclosure, there is provided a vehicle recovery ladder 100 as shown in FIGS. 1a, 1b, and 1c. The ladder includes an elongate molded body 102, and molded traction members 104 that are releasably fastened to the body 104. The traction members 104 are bonded to the body 102 with a chemical and mechanical bond formed during molding. Advantageously, any damaged traction members 104 can be readily released and replaced to maintain the performance of the ladder 100.

The traction members 104 are normally less durable than a vehicle tire so as to sustain damage before the comparatively more expensive tire. The traction members 104 are formed from polymeric material (e.g. elastomer, polyurethane, thermoplastic, nylon). The body 102 is also formed from polymeric material (e.g. elastomer, polyurethane, thermoplastic, nylon). Typically, the body 102 and the traction members 104 are each integrally formed (e.g. injection molded) from the same material.

Figure 2:
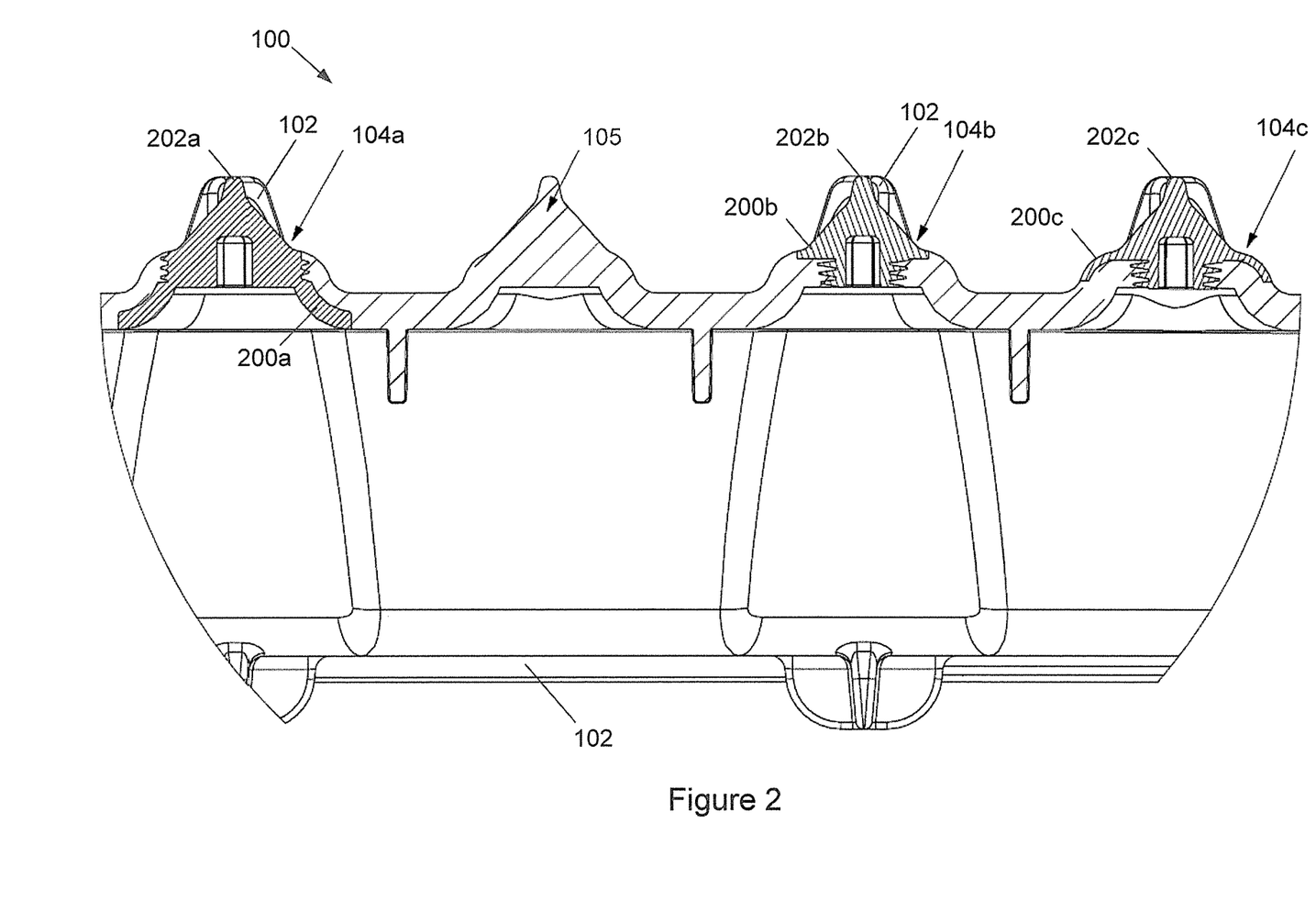
FIG. 2 is a close-up sectional view of the circular inset in FIG. 1a showing various types of traction members in accordance with embodiments of the present disclosure.

FIG. 2 shows four types of traction member 104, namely: novel first, second, and third traction members 104a, 104b, 104c; and a conventional traction member 105 integrally formed with the body 102. In practice, the ladder 100 would usually consist of a single type of traction member 104a, 104b, or 104c.

The traction members 104a, 104b, 104c can be clearly seen in FIGS. 3a, 3b, 4a, 4b, 5a, 5b, respectively. Each traction member 104 includes a rotational release for rotationally releasing the traction member 104 from the body 102. The rotational release includes a thread 300. The rotational release also includes a hexagonal tool recess 302 for receiving a release tool (e.g. Allan key) (not shown).

The ladder 100 includes tongue-in-groove locks for locking the traction members 104 to the body 102. In particular, each traction member 104a, 104b, 104c includes an inhibiter 304a, 304b, 304c, respectively, for inhibiting unintentional release of the traction member 104a, 104b, 104c from the body 102. The inhibiter 304a of the first traction member 104a is a topside tongue for sitting in a complementary groove of the body 102. The inhibiter 304b of the second traction member 104b is an underside groove in which a complementary tongue of the body 102 sits. The inhibiter 304c of the third traction member 104c is an underside groove in which a complementary tongue of the body 102 sits.

Figure 3A:
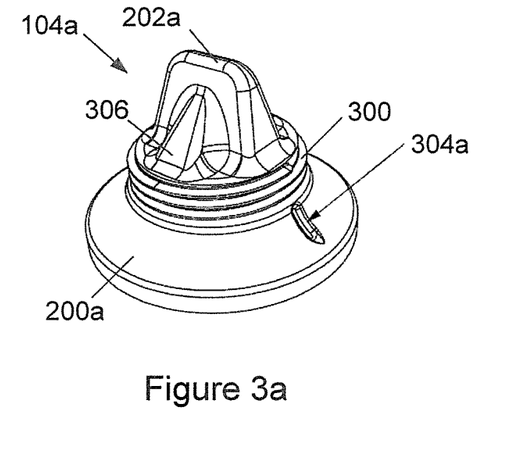
FIG. 3a is an upper perspective view of a first traction member shown in FIG. 2.
Figure 3B:
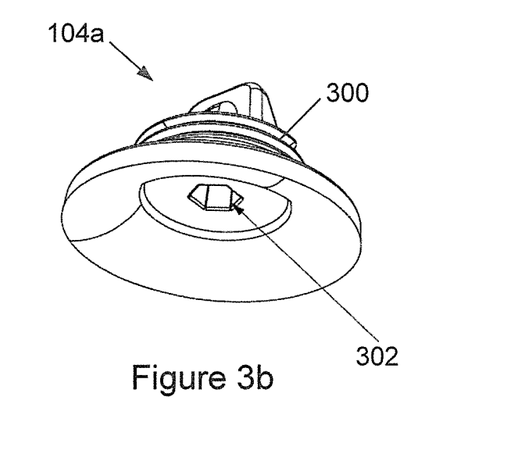
FIG. 3b is a lower perspective view of a first traction member shown in FIG. 2.
Figure 4A:
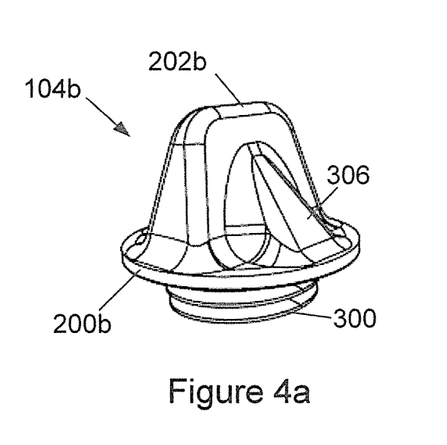
FIG. 4a is an upper perspective view of a second traction member shown in FIG. 2.
Figure 4B:
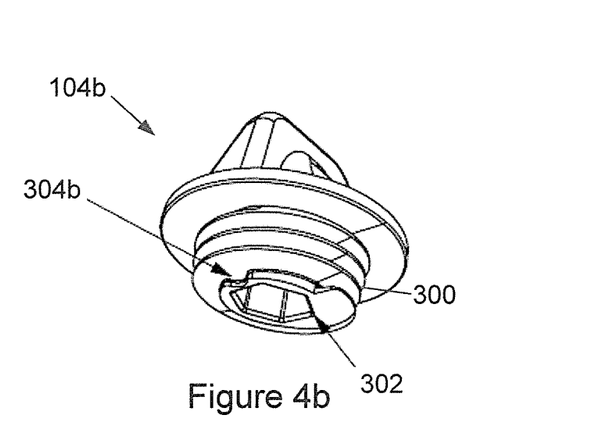
FIG. 4b is a lower perspective view of a second traction member shown in FIG. 2.
Figure 5A:
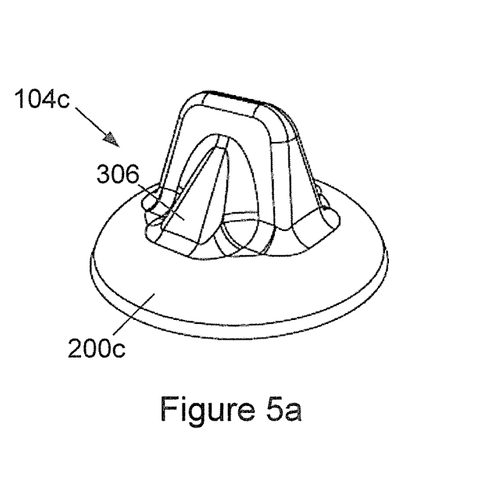
FIG. 5a is an upper perspective view of a third traction member shown in FIG. 2.
Figure 5B:
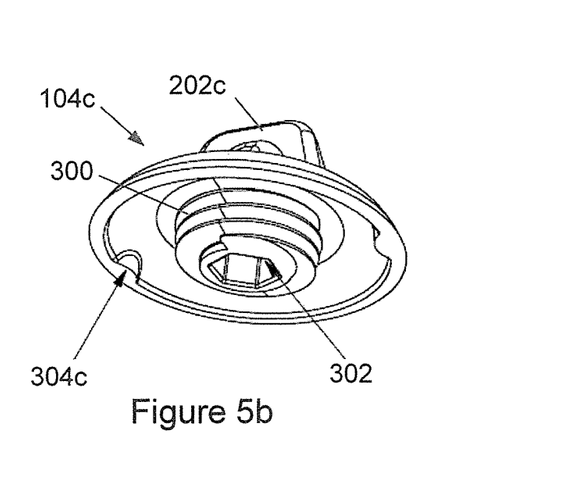
FIG. 5b is a lower perspective view of a third traction member shown in FIG. 2.

Returning to FIG. 2, the traction member 104a is released from the rear or underside of the ladder 100. Alternatively, the traction members 104b, 104c are released from the topside of the ladder 100. Each traction member 104a, 104b, 104c includes a broad skirt 200a, 200b, 200c, respectively, from which a tooth 202a, 202b, 202c upwardly extends. Each tooth is flanked by a pair of support fillets 306 (see. FIGS. 3a, 4a, 5a). As can best be seen in FIG. 2, each traction member 104 is over-molded by the body 102 to give increased breadth.

A method of forming the vehicle recovery ladder 100 is now described.

Firstly, the traction members 104a, 104b, 104c are injection-molded in a traction member mold (not shown) and permitted to set before removal.

Next, the set traction members 104a, 104b, 104c are positioned in a ladder mold (not shown).

Next, the body 102 is injection molded into the ladder mold, and a chemical bond forms between the traction members 104a, 104b, 104c (whichever type is used) and the body 102. A mechanical bond forms with engaging threads of the body 102 and the threads 300 of the traction members 104a, 104b, 104c, as shown in FIG. 2. As shown in FIG. 2, the body 102 is overmolded over the embedded traction members 104 and forms a complementary thread with the traction members. The traction members 104 may have a lower melting point than the body 102 to facilitate chemical bonding between the traction members 104 and the body 102. The chemical bond is formed by crosslinking of the traction member and body materials.

In use, the chemical and mechanical bond is broken when releasing the traction members 104 from the body 102. Another traction member 104 can be threaded into the body 102 to replace a released traction member 104.

Figure 6:
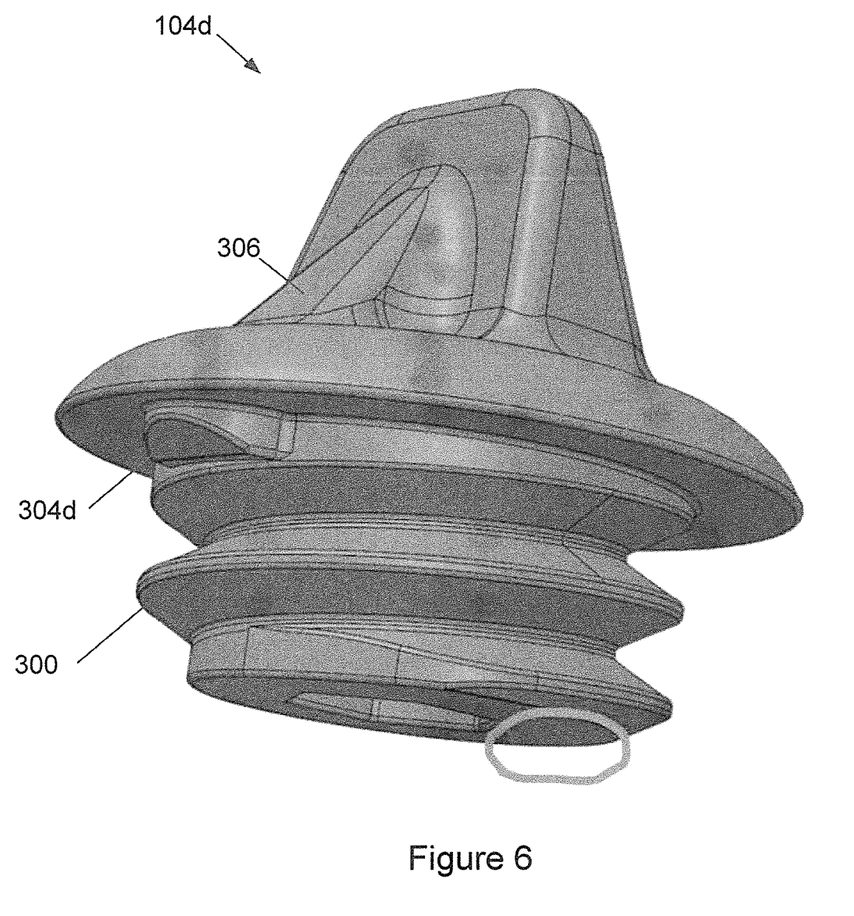
FIG. 6 is a side perspective view of a fourth traction member.

FIG. 6 shows an alternative tire traction member 104d, similar to tire traction member 104b. A first inhibiter 304d, in the form of an interference blip on the thread 300, is provided for inhibiting unintentional release of the traction member 104d from the body 102.

Figure 7:
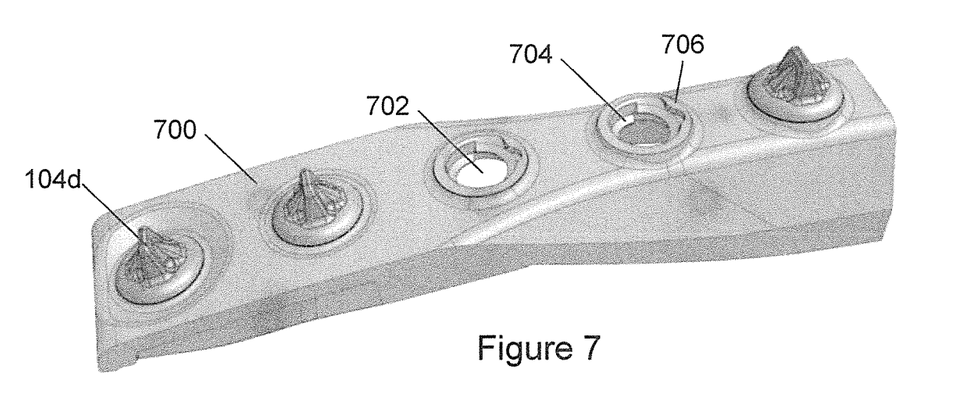
FIG. 7 shows a preformed ladder body to which the fourth traction members of FIG. 6 are fitted.

FIG. 7 shows a pre-formed body 700 which can be used in conjunction with the tire traction member 104d. In particular, the body 700 is molded with receptacles 702 defining internal threads 704. A second inhibiter 706, in the form of an interference blip on the thread 704 at the top of the receptacle 702, is provided for inhibiting unintentional release of the traction member 104d from the body 102. Twisting the tire traction member 104d tight in the receptacle 702 causes the first and second inhibitors 304d, 706 to yield and allow passage of first inhibiter 304d past the second inhibiter 706. The second inhibiter 706 is then impeded from passing over the first inhibiter 304d in a reverse direction when untightening the tire traction member 104d.

Figure 8:
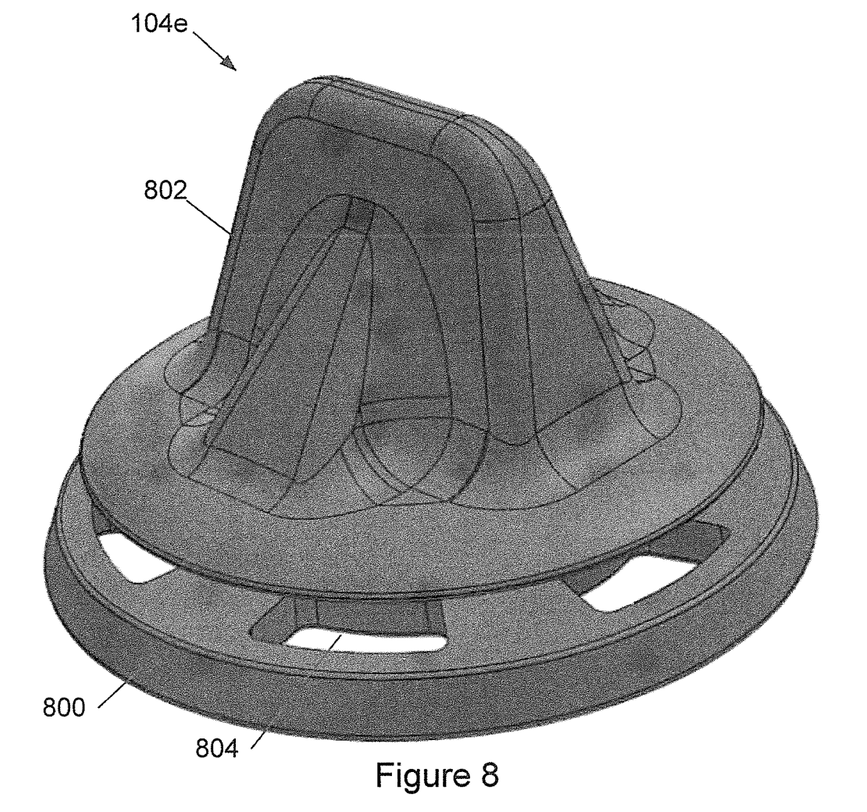
FIG. 8 is an upper perspective view of a non-removable fifth traction member.

FIG. 8 shows an alternative tire traction member 104e without a thread. Instead, the traction member 104e includes a lower retainer 800 from which an upper tooth 802 extends. The retainer 800 defines apertures 804 through which the polymer passes during molding of the body 102 to retain the traction member 104e. The polymer is also located between the traction member 104e and the retainer 800.

Figure 9:
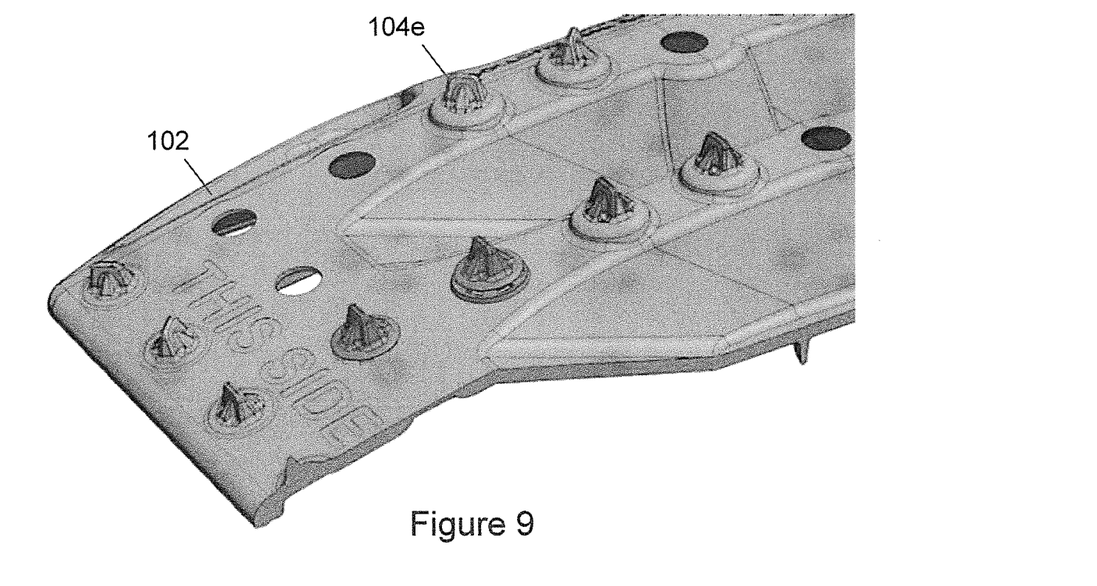
FIG. 9 shows a ladder with overmolded fifth traction members of FIG. 8.

As can best be seen in FIG. 9, the tire traction member 104e is placed in a mold (not shown), and then over-molded with polymer when forming the body 102. The preformed traction members 104e can be made from durable material (molded polymer, aluminum, ceramic, silicon rubber, rubber, etc.), and are nearly indestructible, so that they will not be damaged, and hence they need not be replaceable.

A person skilled in the art will appreciate that many embodiments and variations can be made without departing from the ambit of the present disclosure. For example, the traction members 104 may be formed from metal material (e.g. metal alloy), ceramic material or rubber material. Also, in various embodiments, the traction members 104 may be formed of a different material to the body 102 to suit the particular application (e.g. hard metal teeth for military operations). The traction members 104 may be permanently bonded to, and not releasable from, the body 102. Furthermore, the recess 302 may be pentagonal, octagonal, square, slotted, cross or star shaped.

It is to be understood that the present disclosure is not limited to specific features shown or described, which are currently preferred embodiments of the disclosure.

Reference throughout this specification to 'one embodiment' or 'an embodiment' means that a particular feature, structure, or characteristic described in connection with the embodiment is included in at least one embodiment of the present disclosure. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

What is claimed is:

1. A vehicle recovery ladder, comprising:
a substantially rigid body defining a recovery ladder top side and a recovery ladder bottom side; and
a plurality of tire traction members configured for engaging with a vehicle tire and fastened to the body during forming of the body so as to be accessible from both the top side of the recovery ladder and the bottom side of the recovery ladder, wherein each of the plurality of tire traction members includes a rotational release configured for rotationally releasing the tire traction member from the body.

2. The vehicle recovery ladder of claim 1, wherein the tire traction members include metal material.

3. The vehicle recovery ladder of claim 1, wherein the rotational release includes a thread configured for engaging within the body.

4. The vehicle recovery ladder of claim 1, wherein the rotational release includes a tool recess configured for receiving a release tool.

5. The vehicle recovery ladder of claim 1, wherein each of the plurality of tire traction members includes an inhibiter configured for inhibiting unintentional release of the tire traction member from the body.

6. The vehicle recovery ladder of claim 5, wherein the inhibitor includes one or more formations selected from the group consisting of a tongue, a groove, and a blip.

7. The vehicle recovery ladder of claim 1, wherein each of the plurality of tire traction members includes a skirt from which a tooth extends.

8. The vehicle recovery ladder of claim 1, wherein each of the plurality of tire traction members is over-molded.

9. The vehicle recovery ladder of claim 1, wherein each of the plurality of tire traction members forms a direct bond with the body.

10. The vehicle recovery ladder of claim 9, wherein the direct bond is a chemical bond formed by crosslinking of body material and tire traction member material.

11. The vehicle recovery ladder of claim 10, wherein the chemical bond is breakable to release the tire traction members from the body.

12. The vehicle recovery ladder of claim 9, wherein the direct bond is a mechanical bond including engaged threads on each of the plurality of tire traction members and the body.

13. A vehicle recovery ladder including:
a substantially rigid body defining a recovery ladder top side and a recovery ladder bottom side; and
a plurality of tire traction members, configured for engaging with a vehicle tire, each of the tire traction members releasably fastened to the body by a rotational release including threads engaging within the body, wherein the plurality of tire traction members are releasably fastened to the body during forming the body so as to be accessible from the top side of the recovery ladder and the bottom side of the recovery ladder.

14. The vehicle recovery ladder of claim 13, wherein the threads become engaged within the body when injection molding the body in a mold containing the tire traction members.

15. The vehicle recovery ladder of claim 13, wherein the tire traction members include metal material.

16. The vehicle recovery ladder of claim 13, wherein each of the plurality of tire traction members includes an inhibiter configured for inhibiting unintentional release of the tire traction member from the body.

17. A method of forming a vehicle recovery ladder, the method including the steps of:
- locating a plurality of tire traction members in a mold, wherein the tire traction members are configured for engagement with a vehicle tire; and
- molding a body in the mold to form a bond with the tire traction members;
- wherein the molded body with the tire traction members bonded therein forms a substantially rigid vehicle recovery ladder having a top side and a bottom side;
- wherein each of the plurality of tire traction members includes a rotational release configured for rotationally releasing the tire traction member from the body; and
- wherein the plurality of traction members can be accessed from the topside of the vehicle recovery ladder and the bottom side of the vehicle recovery ladder.

18. A vehicle recovery ladder, comprising:
- a substantially rigid body defining a recovery ladder top side and a recovery ladder bottom side; and
- a plurality of tire traction members configured for engaging with a vehicle tire and fastened to the body during forming of the body so as to be accessible from both the top side of the recovery ladder and the bottom side of the recovery ladder, wherein each of the plurality of tire traction members includes an inhibiter configured for inhibiting unintentional release of the tire traction member from the body, wherein the inhibitor includes one or more formations selected from the group consisting of a tongue, a groove, and a blip.

\* \* \* \* \*